United States Patent
Hunt

(10) Patent No.: US 8,285,038 B2
(45) Date of Patent: Oct. 9, 2012

(54) WHITE BALANCE ADJUSTMENT

(75) Inventor: Alexander Hunt, Malmö (SE)

(73) Assignee: Sony Ericsson Mobile Communications AB, Lund (SE)

(*) Notice: Subject to any disclaimer, the term of this patent is extended or adjusted under 35 U.S.C. 154(b) by 1313 days.

(21) Appl. No.: 11/719,053

(22) PCT Filed: Oct. 19, 2005

(86) PCT No.: PCT/EP2005/011230
§ 371 (c)(1),
(2), (4) Date: May 10, 2007

(87) PCT Pub. No.: WO2006/050791
PCT Pub. Date: May 18, 2006

(65) Prior Publication Data
US 2008/0108384 A1 May 8, 2008

Related U.S. Application Data

(60) Provisional application No. 60/629,378, filed on Nov. 19, 2004.

(30) Foreign Application Priority Data

Nov. 10, 2004 (EP) .................................. 04026674

(51) Int. Cl.
*G06K 9/00* (2006.01)
(52) U.S. Cl. .................... 382/167; 719/321; 348/231.99; 382/233
(58) Field of Classification Search .................. 382/167, 382/233
See application file for complete search history.

(56) References Cited

U.S. PATENT DOCUMENTS

| | | | | |
|---|---|---|---|---|
| 5,438,663 A | * | 8/1995 | Matsumoto et al. | 345/520 |
| 5,910,180 A | * | 6/1999 | Flory et al. | 719/321 |
| 6,160,579 A | * | 12/2000 | Shiraiwa et al. | 348/224.1 |
| 6,657,607 B1 | | 12/2003 | Evanicky et al. | |

(Continued)

FOREIGN PATENT DOCUMENTS

EP  0 481 424 A2  4/1992

(Continued)

OTHER PUBLICATIONS

International Search Report dated Dec. 23, 2005.

(Continued)

*Primary Examiner* — Hadi Akhavannik
(74) *Attorney, Agent, or Firm* — Harrity & Harrity, LLP

(57) ABSTRACT

A portable electronic communication device includes an image memory that stores an image in its original colors; a display that presents the image, in its original colors, when received from the image memory, based on an instruction, received from a user of the portable electronic communication device, to present the image without adjustment to the original colors; and a white balance adjustment device including multiple image signal adjusters that adjust signal levels of image signals corresponding to particular colors, where, when another instruction is received from the user to adjust the original colors, the white balance adjustment device controls the multiple image signal adjusters, based on user input, to select color adjustments and apply the color adjustments to create a color-adjusted image. The portable electronic device also includes another memory that stores the color-adjusted image, where the display is configured to present the color-adjusted image when received from the other memory.

14 Claims, 1 Drawing Sheet

U.S. PATENT DOCUMENTS

| | | | |
|---|---|---|---|
| 6,888,568 B1* | 5/2005 | Neter | 348/222.1 |
| 2001/0006400 A1* | 7/2001 | Kubo et al. | 348/233 |
| 2002/0071041 A1* | 6/2002 | Pine | 348/222 |
| 2002/0154823 A1* | 10/2002 | Okada | 382/233 |
| 2003/0161552 A1* | 8/2003 | Shima et al. | 382/312 |
| 2004/0002302 A1* | 1/2004 | Takemoto et al. | 455/3.06 |
| 2004/0090533 A1* | 5/2004 | Dow et al. | 348/220.1 |
| 2008/0024528 A1* | 1/2008 | Han et al. | 345/690 |

FOREIGN PATENT DOCUMENTS

| | | |
|---|---|---|
| EP | 0 609 761 A2 | 8/1994 |
| EP | 1 126 726 A2 | 8/2001 |
| JP | 11-298848 | 10/1999 |

OTHER PUBLICATIONS

International Preliminary Examination Report dated Nov. 9, 2006.

* cited by examiner

WHITE BALANCE ADJUSTMENT

RELATED APPLICATIONS

This application is the national phase under 35 U.S.C. §371 of PCT International Application No. PCT/EP2005/011230 which has an International filing date of Oct. 19, 2005, which designated the United States of America and which claims priority on European Patent Application Number 04026674.4 filed Nov. 10, 2004, which further claims priority under 35 U.S.C. §119 on U.S. Provisional Application Ser. No. 60/629,378 filed Nov. 19, 2004, which are incorporated by reference herein.

This invention relates to white balance adjustment in portable communication devices. In particular, the present invention relates to a white balance adjustment device for a colour display of a portable communication device and a portable communication device comprising the same adjustment device.

In a portable communication device such as a cellular phone, comprising a colour display, some users do not like the appearance of the colours in display. Typically, to the user, the appearance of the colours seems to change from device to device, i. e., for instance the user of a cellular phone believes that his/her friend has a "better" colour appearance in the display, for instance not so greenish, even if similar cellular phone models are compared. One reason to this is that there is a tolerance in the white LEDs white point illuminating the display. Typically, the tolerance has to exist because of cost and other issues for instance depending on the supplier of the LEDs. Other causes of different white points, may be difference (tolerance) in distance between glasses in the different display modules, which cannot be totally avoided, primarily because of too high cost. However, regardless of reason, this difference (i. e. tolerance) can cause problems in that images shown on the display will have different colour appearances since the displays have different white points.

Further problems may also concern prior art based on analogue technology, which may not be possible to implement in a simple manner. This is for instance described in EP-A1-0 481 424 and EP-A1-0 609 761.

Thus, there is a need to provide a colour adjustment possibility for a colour display in a portable communication device according to a user's preference.

SUMMARY OF THE INVENTION

One object of the present invention is thus directed towards providing digital colour adjustment for a colour display in a portable communication device, that is capable to be user operated, such that requirements concerning colour appearance, and typically also cost and performance are fulfilled.

According to a first aspect of the present invention, there is provided a white balance adjustment device for a colour display of a portable communication device, said white balance adjustment device comprising:
a first image signal adjuster for adjusting a signal level of a first digital image signal corresponding to a first colour,
a second image signal adjuster for adjusting a signal level of a second digital image signal corresponding to a second colour,
and a third image signal adjuster for adjusting a signal level of a third digital image signal corresponding to a third colour,
wherein said white balance adjustment device is arranged to control said first, second and third image signal adjusters depending on user input from a user of the portable electronic communication device to his/her preference.

In this way, digital colour information is shifted according to the user's preference while transferring data to the display such that a particular colour appearance could be obtained in the display. Thus, in this way there is provided user operated adjustment of white balance in the colour information before shown on the display.

According to a second aspect of the present invention, including the first aspect, said first, second and third image signal adjusters are arranged to adjust said first, second and third signal so as to achieve a predetermined ratio among the signal levels.

According to a third aspect of the present invention, including the second aspect, said first, second and third image signal adjusters are arranged to adjust gain.

According to a fourth aspect of the present invention, including any one of the previous aspects said user input is provided by means of selecting a setting of white balance in a menu for white balance adjustment.

According to a fifth aspect of the present invention, including any one of the previous aspects, said image signal adjusters are arranged to adjust three primary colours.

According to a sixth aspect of the present invention, including the fourth aspect, the image signal adjusters are arranged to be either increased or decreased in setting depending on user preference.

According to a seventh aspect of the present invention, including the fifth aspect, said image signal adjusters are arranged to adjust red, green and blue colour.

According to a eight aspect of the present invention, including any one of the previous aspects, the colours can be arranged as 8, 12, 16, 18, 24 and 32 bit colour information that can be adjusted.

According to a ninth aspect of the present invention, including any one of the previous aspects, said white balance adjustment device is arranged in a particular companion chip to the conventional circuitry of the portable communication device.

According to a tenth aspect of the present invention, including any one of the previous aspects, said adjustment device is provided as a software solution.

According to an eleventh aspect of the present invention, including any one of the previous aspects, said adjustment device is integrated in a display driver.

According to yet another aspect of the invention, there is also provided a portable electronic communication device comprising:
a white balance adjustment device for a colour display of a portable communication device, said white balance adjustment device comprising:
a first image signal adjuster for adjusting a signal level of a first digital image signal corresponding to a first colour,
a second image signal adjuster for adjusting a signal level of a second digital image signal corresponding to a second colour,
and a third image signal adjuster for adjusting a signal level of a third digital image signal corresponding to a third colour,
wherein said white balance adjustment device is arranged to control said first, second and third image signal adjusters depending on user input from a user of the portable electronic communication device to his/her preference.

The present invention has many advantages, one being that prior art devices having conventional colour displays are more often returned due to not satisfied users, than a portable communication device comprising a white balance adjustment device according to the present invention, since the problems with unpleasant appearance of the colours in the display will be eliminated, or at least could be reduced by the user himself to his/her preference.

Another important advantage is that the present invention is easy to implement, is cheap and provide yet a feature for the user to personalise his/her portable communication device.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF DRAWING FIGURES

The present invention will now be described in more detail in relation to the enclosed drawings, in which.

DETAILED DESCRIPTION OF THE EMBODIMENTS

Figure 1:
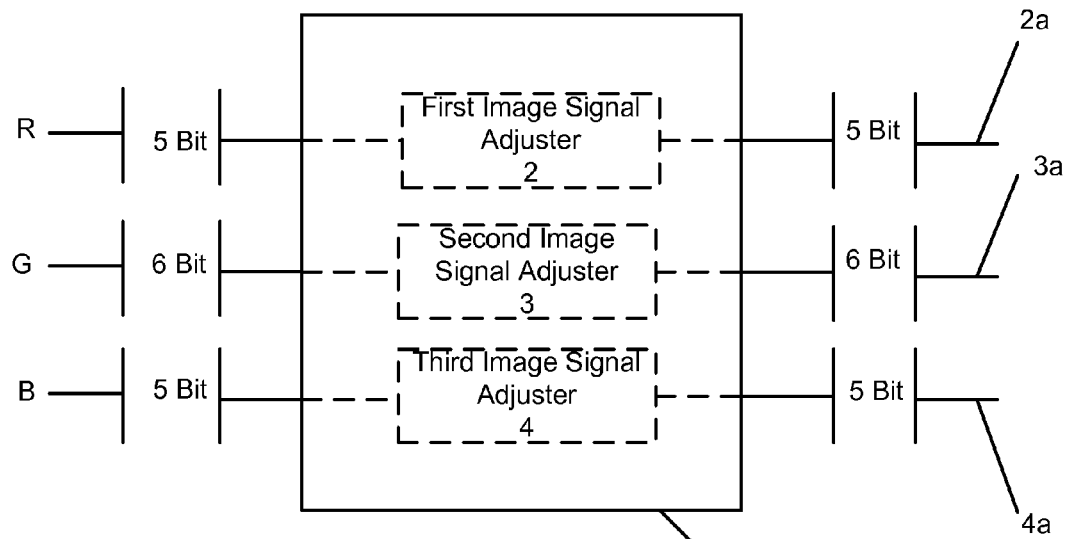
FIG. 1 is a schematic and simplified block diagram of a white balance adjustment device for a colour display of a portable communication device according to an embodiment of the present invention.

Referring now to the drawings, a description will be given in detail of embodiments in accordance with the present invention.

FIG. 1 shows a schematic and simplified block diagram of a white balance adjustment device 1 for a portable communication device having a colour display, according to an embodiment of the invention. The white balance adjustment device 1 can be provided in a particular companion chip, be part of the display driver circuitry or be a pure software solution, or any combination thereof, but will because of simplicity only be described by means of the schematic and simplified block diagram intended to teach all alternatives without limitation to a particular one.

The white balance adjustment device 1 comprises a first digital image signal adjuster 2, a second digital image signal adjuster 3, and a third digital image signal adjuster 4, for adjusting a first 2a, a second 3a, and a third 4a digital image signal corresponding to three primary colours (R, G, B) provided for a colour display (not shown) connectable to the outputs of white balance adjustment device 1 to receive the first, second and third image signals 2a, 3a, and 4a.

The white balance adjustment device 1 controls the first, second and third image signal 2a, 3a, and 4a, depending on user input from a user of the portable communication device to his/her preference. This will be described in more detail below with reference to FIG. 2 illustrating a portable communication device 10 comprising the white balance device 1 described above.

For the sake of simplicity, it is assumed that the first, second and third image signal 2a, 3a, and 4a, each corresponding to R, G, and B colour, are input to and output from the first, second, and third adjuster 2, 3, and 4, which signals represent colour information for the display (as an example, one pixel data is shown: 5 bit red, 6 bit green and 5 bit blue) in a way known per se.

Figure 2:
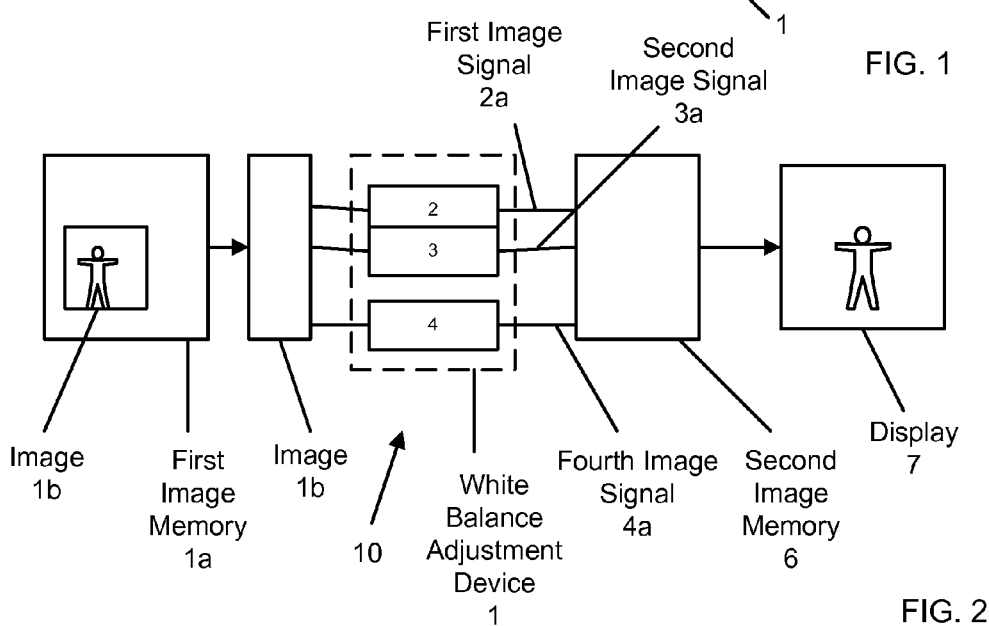
FIG. 2 is a schematic and simplified block diagram of a portable communication device provided with a white balance adjustment device according to an embodiment of the present invention.

FIG. 2 shows a schematic and simplified block diagram of a portable communication device 10 provided with a white balance adjustment device 1 according to an embodiment of the present invention.

The portable communication device 10 in FIG. 2 includes a white balance adjustment device 1, and connected to the image signals adjusters 2, 3, and 4, an image memory 1a having an image stored 1b. The image memory 1a per se is of conventional type typically present in a portable communication device such as a phone memory of a cellular phone, and will therefore not be described in more detail. To the white balance adjustment device 1, i. e. to the outputs of the adjusters 2, 3 and 4, there is further connected a display memory 6 (GRAM), and a colour display 7, which in this case is the conventional colour display 7 and display memory 6 of the portable communication device 10.

The colour display 7 is of conventional type typically having colour filters (not shown) provided over the pixel area, which allows light corresponding to three primary colours, typically red (R), green (G) and blue (B) colour to be transmitted providing a colour image to be displayed. Since the function thereof is well-known for a person skilled in the art, this will not be described in more detail. Moreover, the number of primary colours can be any suitable number including complementary colours and is by no means limited to three.

An image 1b stored in the image memory 1a (herein one pixel data represented by three colours R, G, B) is transmitted to the white balance adjustment device 1 according to the invention which adjusts, i. e. controls the first, second and third image signal 2a, 3a, and 4a, depending on user input from a user of the portable communication device 10 to his/her preference. After adjustment of the three digital image signals 2a, 3a, and 4a, i. e. the R, G, B pixel data, the image 1b is transmitted and stored in the display memory 6 whereby the display 7 will show whatever data is in the display memory 6. For example, in some cases the user may not instruct the white balance adjustment device 1 to adjust any colour data, whereby the original colours of the image 1b will be displayed.

As illustrated in FIG. 2, the colour information is adjusted before the image 1b is shown on the display 7. According to the present invention, the colour information is shifted while transferring the data to the display 7 such that colour information from the stored image 1b in the image memory 1a is adjusted according to a user's preference. This can be achieved because the white balance adjustment device 1 knows exactly when the colour information is to be presented on the display 7.

Preferably, the adjusters 2, 3, and 4 are arranged to adjust their respective signals 2a, 3a, and 4a individually, so as to achieve a predetermined ratio among the adjusted signals. In FIG. 1, the image signal adjusters 2, 3 and 4 are represented as separate units receiving separate control signals (in a way known per se). However, according an alternative embodiment, the first and second adjusters 2, 3 representing red and green colour can receive a combined control signal, or all signal adjusters can be embodied in a single controller for white balance adjustment.

Typically, the three different available adjustments, R, G and B (red, green and blue colour) that can be adjusted (increased or decreased) are "coarse" gain adjustments within a predetermined range, say ±5 to ±15 (depending on what colour depth the display has, for instance 1-32 bit colour depth).

A coarse adjustment is often preferred since it eliminates the need for processing circuitry, simplified shown as the control unit 5, to provide a wide range of adjustment, which may reduce processing speed such that a quick adjustment can be achieved.

For instance, if a user thinks his/her cellular phone display is to yellowish, the user selects a white balance adjustment function provided as selectable numerical values for each colour, for instance provided as a colour bar in a menu system in a way known per se. Depending on which white balance value the user likes, he/she can either increase the blue colour or decrease red and green a couple of steps.

Figure 3:
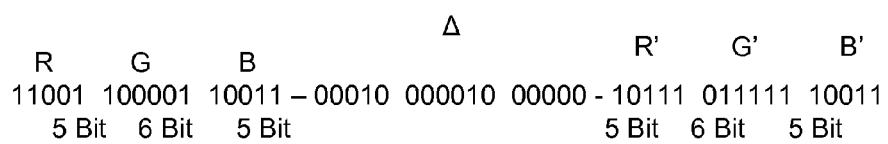
FIG. 3 is a schematic bit pattern diagram of the signal gain processing for 16 bit colour information.

An example where red and green colour are decreased, i.e. the colour information in red (R) and green (G) is shifted, indicated by Δ, is shown in FIG. 3. In FIG. 3 a 16 bit colour information R, G, B (5 bit red, 6 bit green and 5 bit blue) are decreased two steps in red and two steps in green to new colour information R', G', B'.

This could be done in alternative ways such as:
by means of a companion chip
by means of a pure software solution
by integrating the feature into the display driver circuitry. The settings will then be adjusted by register settings in the driver that can be commanded by the software of the cellular phone The above described embodiment is an example, and various modifications can be made without departing from the spirit and scope of the invention. For instance, the coarse adjustment can be modified to a finer one, additional colour adjustments such as magenta, yellow etc can be provided, as well as any suitable array of colours.

It should be realised that a cellular phone is just one type of communication device in which the invention can be implemented. It can just as well be provided in other types of portable electronic equipments such as a lap top computer, a palm top computer, an electronic organizer, a smart-phone, a communicator, or a music playing device.

There are more ways in which the invention can be varied. Therefore the invention is only to be limited by the accompanying claims.

The invention claimed is:

1. A portable electronic communication device comprising:
   a first image memory to store an image;
   a second image memory to store original image settings;
   a display to present the image, according to the original image settings, when retrieved from the first image memory, based on a first instruction, received from a user of the portable electronic communication device, to present the image; and
   a white balance adjustment device including:
      a first image signal adjuster to adjust a signal level of a first image signal corresponding to a first color,
      a second image signal adjuster to adjust a signal level of a second image signal corresponding to a second color, and
      a third image signal adjuster to adjust a signal level of a third image signal corresponding to a third color,
   where, when a second instruction is received from the user to adjust the original image settings, the white balance adjustment device is to control the first, second, and third image signal adjusters based on user input, received from the user, to select color adjustments and apply the color adjustments to the image to create a color-adjusted image,
   where the second image memory is to store the color adjustments,
   where, after the color adjustments are stored in the second image memory, the display is to present images according to the color adjustments.

2. The portable electronic communication device of claim 1, where the first, second and third image signal adjusters are arranged to adjust the first, the second, and the third image signals so as to achieve a predetermined ratio among the signal levels.

3. The portable electronic communication device of claim 2, where the first, the second, and the third image signal adjusters are arranged to adjust gain.

4. The portable electronic communication device of claim 1, where the user input corresponds to setting white balance in a menu for white balance adjustment.

5. The portable electronic communication device of claim 1, where the first, second, and third image signal adjusters are arranged to adjust three primary colors.

6. The portable electronic communication device of claim 4, where the first, second, and third image signal adjusters are arranged to be either increased or decreased in setting depending on user preference.

7. The portable electronic communication device of claim 5, where the first, second, and third image signal adjusters are arranged to adjust red, green, and blue colors.

8. The portable electronic communication device of claim 1, where the colors are arranged as adjustable 8, 12, 16, 18, 24, and 32 bit color information.

9. The portable electronic communication device of claim 1, where the white balance adjustment device is arranged in a particular companion chip to other circuitry of the portable communication device.

10. The portable electronic communication device of claim 1, where the white balance adjustment device is provided as software.

11. The portable electronic communication device of claim 1, where the white balance adjustment device is integrated in a display driver.

12. The portable electronic communication device of claim 1, where the second image memory is communicatively coupled to the display.

13. The portable electronic communication device of claim 1, where the second image memory includes a GRAM.

14. The portable electronic communication device of claim 1, where the portable electronic communication device comprises a cellular telephone.

* * * * *